United States Patent [19]

Grünner

[11] 4,155,687
[45] May 22, 1979

[54] APPARATUS FOR MOLDING TIRES WITH A REINFORCEMENT BELOW THE TREAD SURFACE

[76] Inventor: Erich Grünner, Voltagasse 43/23/1, 1210 Wien, Austria

[21] Appl. No.: 925,463

[22] Filed: Jul. 17, 1978

[30] Foreign Application Priority Data

Jul. 15, 1977 [AT] Austria ............................ 5150/77

[51] Int. Cl.² .................... B29F 1/00; B29C 6/00; B29H 5/02; B29H 5/08
[52] U.S. Cl. .................... 425/3; 425/129 R; 425/542; 425/577
[58] Field of Search .............. 425/3, 110, 129, 29, 425/542, 577, 589; 152/362.314

[56] References Cited

U.S. PATENT DOCUMENTS

| | | | |
|---|---|---|---|
| 2,770,013 | 11/1956 | Crooker | 425/3 |
| 2,808,621 | 10/1957 | Torrey | 425/3 X |
| 3,381,736 | 5/1968 | Ford et al. | 152/362.314 |
| 3,461,502 | 8/1969 | Tink et al. | 425/29 |
| 3,551,957 | 1/1971 | Ramm | 425/3 |
| 3,910,748 | 10/1975 | Kopernik | 425/3 X |
| 4,043,725 | 8/1977 | Schmidt | 425/542 |
| 4,059,375 | 11/1977 | Koch et al. | 425/589 |

*Primary Examiner*—J. Howard Flint, Jr.
*Attorney, Agent, or Firm*—Michael J. Striker

[57] ABSTRACT

An apparatus for molding tires with a reinforcement below the tread surface comprises a support, a multipart mold including an inner core, upper and lower mold parts coaxial with the core and respectively abutting against opposite ends of the latter and a plurality of mold segments arranged about the core and movable with respect thereto between an open and a closed position engaging in the latter position said upper and lower mold parts, a plurality of gripper arms mounted circumferentially spaced from each other on said support about the mold and having free ends on which grippers, preferably in the form of magnets, are provided for releasably holding annular reinforcements and for introducing the reinforcements into the mold while the mold segments are in the open position, and holders on the mold segments for holding the reinforcements introduced into the molds in fixed position during molding of the tire while said gripper arms are withdrawn.

10 Claims, 3 Drawing Figures

APPARATUS FOR MOLDING TIRES WITH A REINFORCEMENT BELOW THE TREAD SURFACE

BACKGROUND OF THE INVENTION

The present invention relates to an apparatus for molding tires for motor vehicles in which the tires are provided with annular reinforcements located below the tread surface of the tire. Such an apparatus includes a mold comprising an inner core, an upper and a lower mold end part arranged coaxial with the core and engaging respectively upper and lower portions of the latter as well as a plurality of segments for forming the region of the tread surface of the tire and arranged about the core radially spaced from the latter, whereby such segments are movable in radial and/or axial direction toward and away from the core.

To improve the useful life of a tire and to improve the running characteristics thereof, it has been proven advantageous to provide besides reinforcements in form of wire cores not only in the bead region of the tire but also to provide radially inwardly respectively below the tread surface of the tire a reinforcing insert comprising a layer of preferably metallic treads, wires or cables.

In known molds for injection molding tires for motor vehicles the insertion of such a thread surface reinforcement insert onto the tire foundation or tire body which usually is produced in a first injection process is very cumbersome, because such insertion has to be carried out by hand and in addition it is practically impossible to maintain this reinforcement insert for the tread surface in its proper place during the injection molding of the tread surface so as to assure thereby the quality of the finished tire.

SUMMARY OF THE INVENTION

It is an object of the present invention to provide an apparatus for molding tires of motor vehicles in which the tire is provided with a tread surface reinforcement insert and in which an exact position and maintenance of such a position of the reinforcement insert is maintained until the tread surface region of the tire is molded.

With these and other objects in view, which will become apparent as the description proceeds, the apparatus for molding tires for motor vehicles in which the tires are provided below the tread surface with reinforcements, mainly comprises a multi-part mold mounted on support means and comprising an inner core, a pair of end mold parts arranged coaxial with the core at opposite ends of the latter, and a plurality of mold segments arranged about the core for forming the region inwardly of the tread surface of the tire and being movable toward and away from the core between an open and a closed position engaging the end mold parts, means for moving an annular reinforcement into the mold, and means on the mold for holding a reinforcement introduced into the latter in a fixed position relative thereto.

The means for moving the reinforcement into the mold preferably comprise a plurality of gripper arms circumferentially displaced about the mold and movable in a direction of the mold axis and carrying grippers on the free end of each of the aforementioned arms. Such grippers are preferably constituted by magnets.

The plurality of gripper arms are preferably arranged in pairs with the arms of each pair adjacent each other and with adjacent pairs spaced from each other in circumferential direction a distance so as to permit a mold segment therebetween to move to the closed position.

The means for holding a reinforcement introduced into the mold in fixed position relative thereto comprise a holder, preferably in the form of a magnet, provided at least on each second of the mold segments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
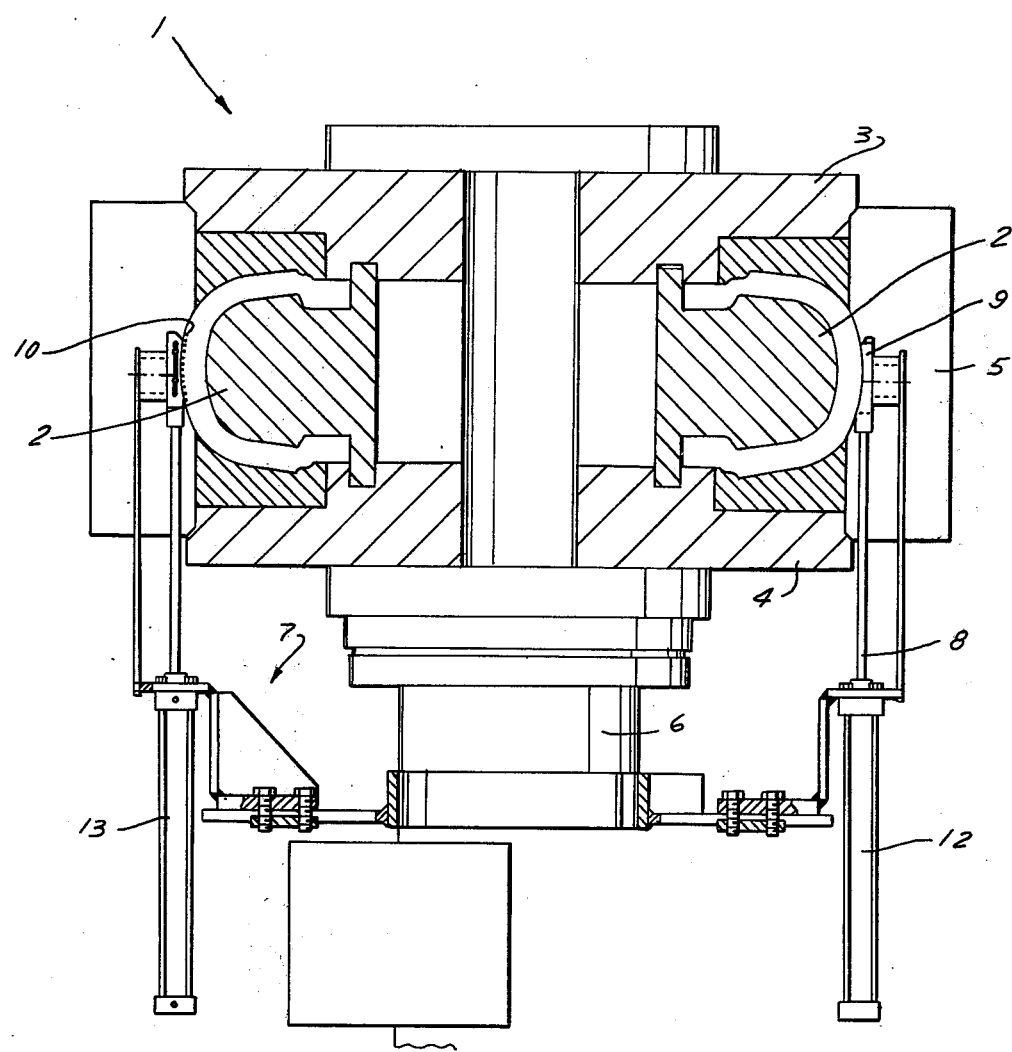
FIG. 1 is a schematic cross-section through a mold and showing also the device for introducing a reinforcement for the tread surface on the tire to be molded.
Figure 2:
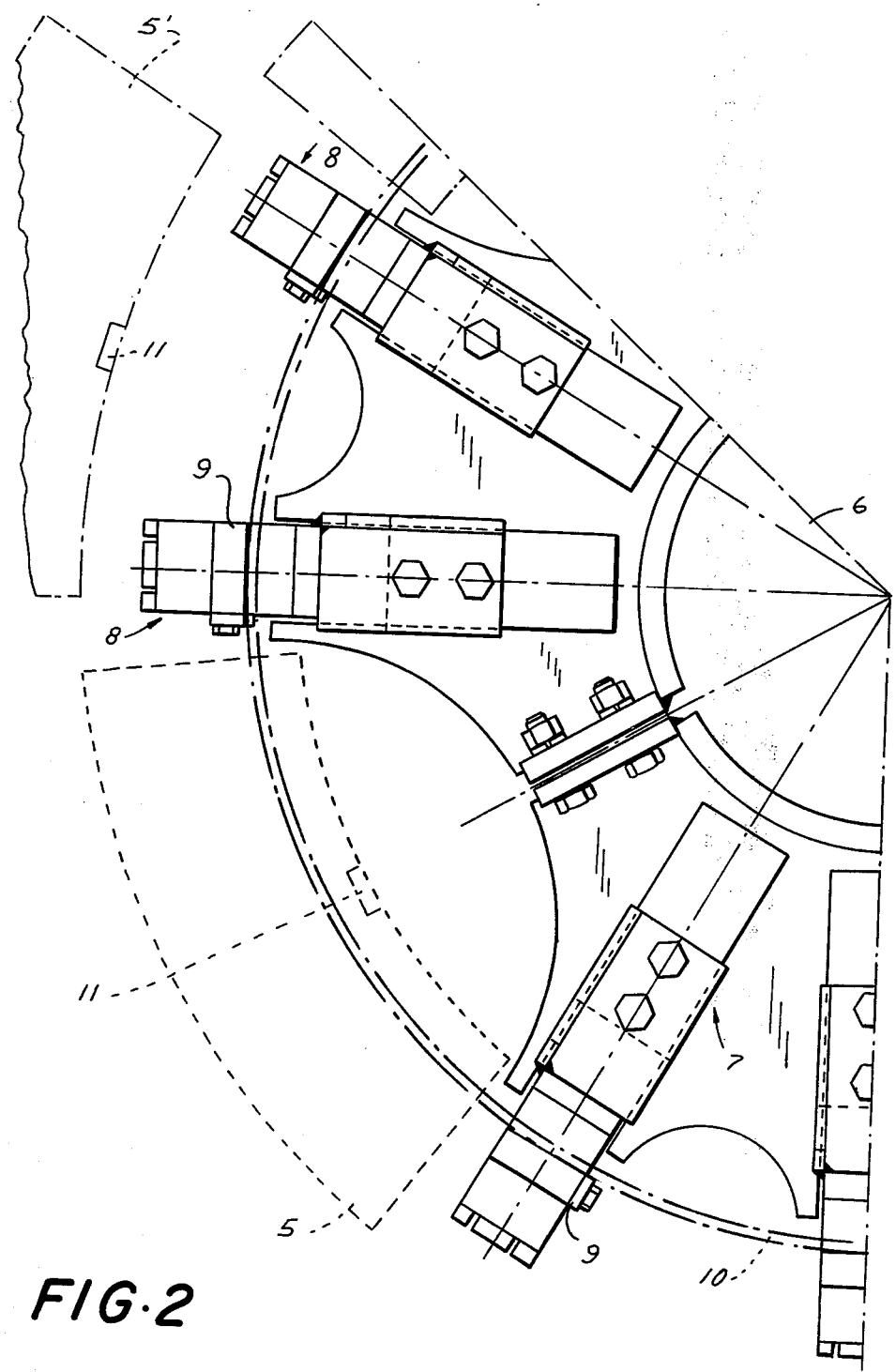
FIG. 2 is a partial top view of the device for introducing the reinforcement for the tread surface of the tire into the mold.

FIG. 1 schematically illustrates a cross-section through a multi-part mold 1 as well as a device 7 for introducing an annular reinforcing insert 10 into the mold 1. The mold 1 comprises a core 2, an upper and a lower mold end part 3, respectively 4, coaxially arranged with the core 2 and respectively abutting against upper and lower ends of the central core 2. The mold parts 2, 3 and 4 are held in abutting relationship on a central support 6 with at least the upper mold part 3 removable in axial direction from the core 2 and the latter removable in axial direction from the lower mold part 4. The simplified mold shown in FIG. 1 illustrates also some of the outer mold segments 5 for forming the region inwardly of the tread surface of the tire to be molded and which are movable in a manner as will be described later on toward and away from the core 2 and the upper and lower mold parts 3 and 4. The device 7 for introducing an annular reinforcing insert 10 into the mold, while the segments 5 are moved to an open position, comprises a plurality of gripper arms or gripper rods 8 forming piston rods of fluid-operated cylinder-and-piston means 12 circumferentially spaced from each other about the support 6 and connected thereto in the manner shown in FIG. 1. The gripper arms or gripper rods 8 carry at the upper ends grippers 9, preferably formed by electromagnets, which may be energized and deenergized in a known manner, not shown in the drawing. The annular reinforcement 10 formed by wires of ferromagnetic material is held by the gripper magnets 9 when the latter are energized and is placed on the magnets 9 while the upper mold end part 3 is removed and the segments 5 are in the open position to then be moved by the gripper arms 8 to the horizontal center plane of the mold 1. Thereafter the upper mold end part 3 is closed as well as part of the segments 5 are brought to the closed position as schematically indicated in FIG. 2 and at least these segments are provided with holding means 11 in form of magnets which hold the reinforcement 10 in the position at which they are introduced by the electromagnets 9 on the free ends of the gripper arms 8. After the reinforcement 10 is held in place by the magnets 11 on the segments 5, the electromagnets 9 on the gripper arms 8 are deenergized and the gripper arms 8 are withdrawn by the cylinder-and-piston means 12 to a starting position below the mold 1, whereafter the remaining segments 5' are brought to the closed position.

In the embodiment illustrated in FIG. 2 the portions of the mold forming the region inwardly of the tread surface of the tire comprises eight segments of identical size 5 and 5' which are uniformly displaced in circumferential direction arranged about the circumference of the core. The device 7 for introducing the reinforcement 10 comprises likewise eight gripper arms 8 which are distributed about the circumference of the mold in pairs with the gripper arms of each pair arranged adjacent each other while adjacent pairs are spaced from each other in circumferential direction a distance to permit every second mold section 5 arranged therebetween to move to the closed position, as shown in FIG. 2. After the four mold sections 5 are moved to the closed position whereby the reinforcement 10 is held by the magnets 11 on each of the segments 5, the electromagnets 9 on the gripper arms are deenergized and the gripper arms 8 are moved downwardly by the cylinder-and-piston means 12 to a position below the mold 1, whereafter the remaining four segments 5' are closed and the material for forming the tire body is injected into the mold cavity in a manner known in the art and not illustrated in the drawing.

Figure 3:
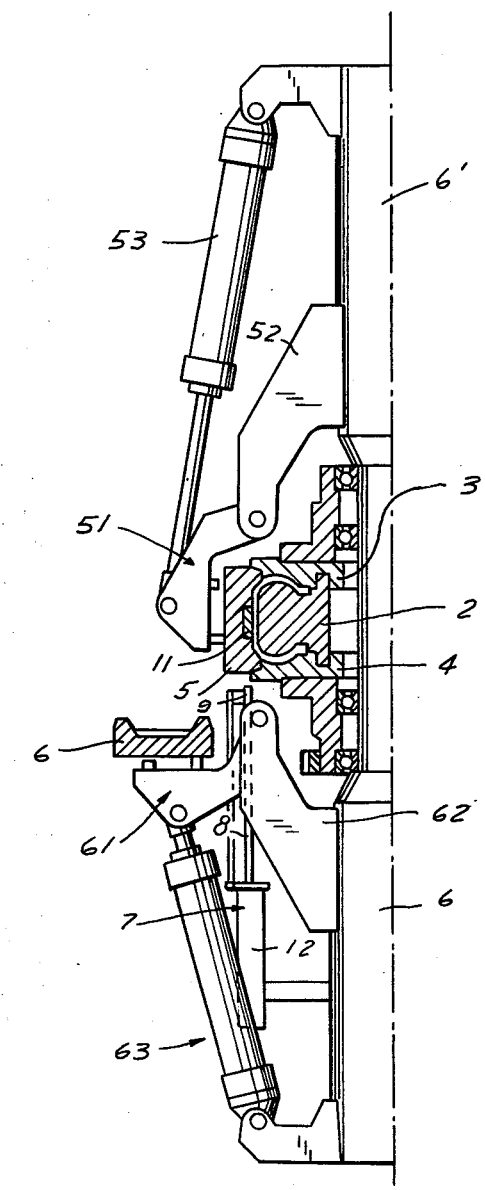
FIG. 3 is a partial cross-section through a molding apparatus according to the present invention for molding tires with a reinforcement below the tread surface.

While FIGS. 1 and 2 show the mold 1 in a simplified manner, FIG. 3 shows part of the mold arrangement together with the device 7 for introducing the reinforcement into the open mold in a construction which permits to first form a tire body and subsequently thereto also the tread surface of the tire. The mold shown in FIG. 3 again includes a central core 2, an upper mold end part 3 and a lower mold end part 4, respectively abutting with portions thereof against the core 2. The lower mold end part 4 is mounted on a central cylindrical column 6 whereas the upper mold end part 3 is mounted on an upper cylindrical column 6', which is movable in axial direction relative to the lower column 6 by known means, not shown in the drawing. The mold includes further a first plurality of mold segments 5, of which only one is shown in FIG. 3, for forming a tire body and for instance eight of such mold segments 5 are circumferentially displaced about the core and each supported by a segment carrier 51 which is tiltably arranged on an arm 52 projecting laterally from the upper column 6' and movable toward and away from the core by cylinder-and-piston means 53 pivotally connected at opposite ends to the carrier 51 and to the upper column 6' in the manner as shown in FIG. 3. Each segment 5 carries at the inner surface thereof a holding magnet 11. The mold includes further a plurality of additional segments 6, equal in number to the segment 6 for molding the tread surface region of a tire. Each of the segments 6 is carried by a segment carrier 61 which is in turn tiltably connected at one end to an arm 61 projecting laterally from the lower column 6 and movable between an open and a closed position by fluid-operated cylinder-and-piston means 63 pivotally connected at opposite ends to the segment carrier 61 and to the lower column 6 in the manner as shown in FIG. 3. The apparatus includes further a device 7 for introducing a reinforcement into the open mold and the device 7 comprises a plurality of gripper arms or gripper rods 8, of which only one is shown in FIG. 3, respectively forming the piston rod of cylinder-and-piston means 12 connected to the column 6 in the manner as schematically shown in FIG. 3. Each of the gripper arms or gripper rods 8 again carries at its upper free end a gripper 9, preferably in the form of an electromagnet in the manner as described in connection with FIG. 1 and 2.

The apparatus as shown in FIG. 3 will be operated as follows:

At the start of the operation the upper mold part 3 and the lower mold part 4 engage with surface portions thereof the central core 2 and the segments 5 and 6 are in the open position. In this position of the various mold elements an annular reinforcement, formed by wires of ferromagnetic material held by the electromagnets 9 of the device 7 is moved into the open mold by moving the gripper arms or gripper rods 8 to the extended position by the fluid-operated cylinder-and-piston means 12 so that the reinforcement is held in a horizontal central plane of the mold. The gripper arms 8 of the device 7, of which eight are provided, are again arranged in pairs in the manner as described in connection with FIGS. 1 and 2 to permit every second mold segment 5 to move between adjacent pairs of gripper arms 8 to the closed position. After the annular reinforcement is thus placed in proper position in the mold, every second of the segments 5, that is the segments arranged between the pairs of gripper arms 8, is brought to the closed position by expanding the respective cylinder-and-piston means 53 so that the reinforcement will be held in its proper place by magnets 11 provided at least on each second segment 5. Subsequently thereto the electromagnets 9 on the upper ends of the gripper arms 8 are deenergized and the gripper arms are withdrawn to their starting position as shown in FIG. 3. Subsequently thereto the remaining segments 5 are also brought to the closed position by expanding the respective cylinder-and-piston means 53 so that the mold is now ready for molding the tire body with the reinforcement held in proper place by the magnets 11 provided at least on each second mold segment 5. Of course, it is also possible to provide a holding magnet 11 on each segment 5 which will further improve holding of the annular reinforcement during injection molding of the tire body. After the tire body is molded with the reinforcement embedded at its outer surface, the segments 5 are brought to the open position. Subsequently thereto, the segments 6 are closed by expanding the cylinder-and-piston means 63 and the tread surface region of the tire is molded about the reinforcement 10. After the tire is molded to its finished shape, the segments 6 are opened and the upper column 6' with the upper mold end part 3 is then moved in upward axial direction by known means, not shown in the drawing, whereafter the core 2 with the molded tire thereon may be removed from the apparatus and subsequently thereto the core which is composed of a plurality of segments may be removed from the interior of the tire.

With the apparatus according to the present invention it is therefore possible to maintain the tread surface reinforcing insert during the whole molding process exactly at the desired location of the finished tire. This will assure production of tires with improved service life and improved running characteristics.

It will be understood that each of the elements described above, or two or more together, may also find a useful application in other types of apparatus for molding tires with annular tread surface reinforcing inserts differing from the types described above.

While the invention has been illustrated and described as embodied in an apparatus for molding tires with annular tread surface reinforcing inserts into the open mold and for holding said inserts in proper position during the molding process, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for molding tires for motor vehicles in which the tires are provided with reinforcements at the tread surface, a combination comprising support means; multi-part mold means mounted on said support means and comprising an inner core having an axis and opposite ends, a pair of end mold parts arranged coaxial with said core at opposite ends of the latter and a plurality of mold segments arranged about said core for forming the region inwardly of the tread surface of the tire and being movable toward and away from the core between an open and a closed position engaging said end mold parts; means for moving an annular reinforcement into said mold means while said segments are in the open position; and means on said mold means for holding a reinforcement introduced into said mold means in a fixed position relative thereto.

2. A combination as defined in claim 1, wherein said means for moving said reinforcement into said mold means comprise a plurality of gripper arms circumferentially displaced about said mold means movable in the direction of said axis and having each a free end and gripper means on the free end of each of said arms.

3. A combination as defined in claim 2, wherein said gripper means are constituted by electromagnets.

4. A combination as defined in claim 2, and including fluid-operated cylinder-and-piston means carried by said support means for moving each of said gripper arms in said direction.

5. A combination as defined in claim 2, wherein said plurality of gripper arms are arranged in pairs with the arms in each pair arranged adjacent each other and with the adjacent pairs spaced from each other in circumferential direction a distance so as to permit a mold segment therebetween to move to the closed position.

6. A combination as defined in claim 1, wherein said means for holding a reinforcement introduced into said mold means in fixed position relative thereto comprises a holder provided at least on each second of said mold segment.

7. A combination as defined in claim 6, wherein each of said holders comprises a magnet.

8. A combination as defined in claim 1, and including a carrier for each of said mold segments and means for moving said carrier and said mold segment carried thereby between an open and a closed position.

9. A combination as defined in claim 8, wherein each of said carriers is pivotally mounted on said support means, and wherein said moving means for each of said carriers comprises fluid-operated cylinder-and-piston means pivotally connected at opposite ends to said support means and the respective carrier.

10. A combination as defined in claim 8, wherein said mold means includes a further plurality of mold segments for subsequently forming the region of the tread surface of a tire body, at least every second one of the first mentioned plurality of mold segments being provided with a holding magnet for holding an annular reinforcement introduced into the open mold in a proper position during molding of the region of the tread surface.

* * * * *